United States Patent
Fisker et al.

(10) Patent No.: US 9,580,066 B2
(45) Date of Patent: Feb. 28, 2017

(54) VEHICLE OPERATION MODE SYSTEMS AND METHODS

(71) Applicant: Karma Automotive LLC, Costa Mesa, CA (US)

(72) Inventors: Henrik Fisker, Los Angeles, CA (US); Thomas Fritz, Ann Arbor, MI (US); Paul E. Boskovitch, Costa Mesa, CA (US); Kevin Walsh, Orange, CA (US)

(73) Assignee: Karma Automotive LLC, Costa Mesa, CA (US)

( * ) Notice: Subject to any disclaimer, the term of this patent is extended or adjusted under 35 U.S.C. 154(b) by 0 days.

(21) Appl. No.: 14/679,945

(22) Filed: Apr. 6, 2015

(65) Prior Publication Data

US 2016/0244046 A1 Aug. 25, 2016

Related U.S. Application Data

(63) Continuation of application No. 13/847,705, filed on Mar. 20, 2013, now abandoned, which is a
(Continued)

(51) Int. Cl.
*B60W 20/00* (2016.01)
*B60W 10/18* (2012.01)
(Continued)

(52) U.S. Cl.
CPC ............. *B60W 20/14* (2016.01); *B60K 6/46* (2013.01); *B60K 6/52* (2013.01); *B60L 7/18* (2013.01);
(Continued)

(58) Field of Classification Search
CPC .... B60W 20/14; B60W 50/082; B60W 10/06; B60W 10/18; B60W 20/00;
(Continued)

(56) References Cited

U.S. PATENT DOCUMENTS

| | | | | |
|---|---|---|---|---|
| 5,839,533 A | * | 11/1998 | Mikami | ................. B60K 6/365 180/165 |
| 6,321,143 B1 | * | 11/2001 | Phillips | ................. B60K 6/485 180/165 |

(Continued)

FOREIGN PATENT DOCUMENTS

| | | |
|---|---|---|
| DE | 010302504 A1 | 9/2004 |
| EP | 0744314 B1 | 9/2000 |

(Continued)

OTHER PUBLICATIONS

Japanese Patent Office, Notification of the Reasons for Rejection—English Version of Japanese Office Action regarding corresponding Japanese Application No. 2013-523309 issued May 20, 2014, pp. 1-3.

(Continued)

*Primary Examiner* — Rodney Butler
(74) *Attorney, Agent, or Firm* — Farjami & Farjami LLP

(57) ABSTRACT

A system for controlling a mode of operation of a vehicle having a rechargeable energy storage system (RESS), an engine, and a drive motor coupled to the RESS and the engine, the drive motor selectively powered by at least one of the RESS and the engine includes a controller operable to adjust the vehicle to operate in a plurality of operating modes including a first mode in which the drive motor is powered by the RESS, a second mode in which the drive motor is powered more by the engine than the RESS. When the second mode of operation is selected, controller is configured to operate the engine as necessary to maintain the RESS at or above a predetermined state of charge.

16 Claims, 10 Drawing Sheets

Related U.S. Application Data continuation of application No. 13/569,886, filed on Aug. 8, 2012, now abandoned, and a continuation-in-part of application No. 13/197,608, filed on Aug. 3, 2011, now abandoned.

(60) Provisional application No. 61/550,015, filed on Oct. 21, 2011, provisional application No. 61/370,561, filed on Aug. 4, 2010.

(51) Int. Cl.

| | |
|---|---|
| *B60W 10/06* | (2006.01) |
| *B60W 10/08* | (2006.01) |
| *B60K 6/46* | (2007.10) |
| *B60K 6/52* | (2007.10) |
| *B60L 7/18* | (2006.01) |
| *B60Q 5/00* | (2006.01) |
| *B60W 50/08* | (2012.01) |

(52) U.S. Cl.
CPC ............ *B60Q 5/008* (2013.01); *B60W 10/06* (2013.01); *B60W 10/08* (2013.01); *B60W 10/18* (2013.01); *B60W 20/00* (2013.01); *B60W 50/082* (2013.01); *B60W 2710/244* (2013.01); *Y02T 10/6217* (2013.01); *Y02T 10/6265* (2013.01); *Y10S 903/93* (2013.01); *Y10S 903/947* (2013.01)

(58) Field of Classification Search
CPC . B60W 10/08; B60W 2710/244; B60Q 5/008; B60L 7/18; B60K 6/46; B60K 6/52; Y02T 10/6217; Y02T 10/6265; Y10S 903/947; Y10S 903/93
See application file for complete search history.

(56) References Cited

U.S. PATENT DOCUMENTS

| | | | |
|---|---|---|---|
| 7,014,592 B2 * | 3/2006 | Wiethe | F16H 61/21 477/120 |
| 7,028,795 B2 | 4/2006 | Tabata | |
| 9,180,789 B2 * | 11/2015 | Higashitani | B60L 15/20 |
| 2001/0030400 A1 | 10/2001 | Zetterstrom | |
| 2004/0207350 A1 | 10/2004 | Wilton et al. | |
| 2005/0093303 A1 | 5/2005 | Turner | |
| 2005/0256631 A1 * | 11/2005 | Cawthorne | B60K 6/40 701/99 |
| 2006/0113127 A1 | 6/2006 | Dong et al. | |
| 2007/0151781 A1 | 7/2007 | Kuang et al. | |
| 2008/0238185 A1 * | 10/2008 | Craig | B60T 13/588 303/3 |
| 2008/0257701 A1 | 10/2008 | Wlotzka | |
| 2008/0300743 A1 | 12/2008 | Conlon et al. | |
| 2009/0145673 A1 | 6/2009 | Soliman et al. | |
| 2009/0321165 A1 * | 12/2009 | Haug | B60W 20/00 180/65.275 |
| 2010/0000806 A1 * | 1/2010 | Caudill | B60K 6/00 180/65.21 |
| 2010/0025131 A1 | 2/2010 | Gloceri et al. | |
| 2010/0138089 A1 | 6/2010 | James | |
| 2010/0198436 A1 * | 8/2010 | Falkenstein | B60K 6/387 701/22 |
| 2010/0211242 A1 | 8/2010 | Kelty et al. | |
| 2011/0017532 A1 * | 1/2011 | Langford | B60K 6/24 180/65.21 |
| 2011/0155489 A1 | 6/2011 | Wenger et al. | |
| 2011/0298219 A1 | 12/2011 | Wenger et al. | |
| 2012/0029741 A1 * | 2/2012 | Gleason | B60L 15/2045 701/22 |
| 2012/0158227 A1 | 6/2012 | Tate et al. | |
| 2012/0255799 A1 | 10/2012 | Kohler et al. | |

FOREIGN PATENT DOCUMENTS

| | | |
|---|---|---|
| EP | 1738947 A2 | 1/2007 |
| EP | 1911650 B1 | 12/2010 |
| JP | H8-29224 | 1/1996 |
| JP | H08-79907 A | 3/1996 |
| JP | 2001-231103 A | 8/2001 |
| JP | 2004-330924 A | 11/2004 |
| JP | 2007-69787 A | 3/2007 |
| JP | 2007-269249 A | 10/2007 |
| JP | 2009-248822 | 10/2009 |
| JP | 2010-70030 A | 4/2010 |
| JP | WO 2011/048636 | 4/2011 |
| JP | 2011-156985 | 8/2011 |
| JP | 2011-207300 A | 10/2011 |
| KR | 10-1998-0040288 A | 8/1998 |

OTHER PUBLICATIONS

Korean Intellectual Searching Authority/Korean Intellectual Property Office, International Search Search Report regarding corresponding PCT Application No. PCT/US2012/061129 issued Mar. 29, 2013, pp. 1-9.

U.S. International Searching Authority, International Search Search Report regarding corresponding PCT Application No. PCT/US2011/046445 issued Jan. 10, 2012, pp. 1-2.

* cited by examiner

US 9,580,066 B2

VEHICLE OPERATION MODE SYSTEMS AND METHODS

CROSS-REFERENCE TO RELATED PATENT APPLICATIONS

This application is a continuation of U.S. patent application Ser. No. 13/847,705 filed on Mar. 20, 2013, which is a continuation of U.S. patent application Ser. No. 13/569,886 filed on Aug. 8, 2012, which claims priority to U.S. Provisional Patent Application No. 61/550,015 filed on Oct. 21, 2011 and is a continuation-in-part of U.S. patent application Ser. No. 13/197,608 filed on Aug. 3, 2011, which claims priority to U.S. Provisional Patent Application 61/370,561, filed on Aug. 4, 2010. Each of the foregoing applications are incorporated herein by reference as if set forth in their entireties.

BACKGROUND

The present disclosure relates generally to hybrid or electric vehicles, and particularly to a plurality of operating modes associated with hybrid or electric vehicles.

Vehicles, such as motor vehicles, utilize an energy source in order to provide power to operate the vehicle. While petroleum-based products, such as gasoline, dominate as an energy source in traditional combustion engines, alternative energy sources are available, such as methanol, ethanol, natural gas, hydrogen, electricity, solar, and/or the like. A hybrid powered vehicle, referred to as a "hybrid vehicle," utilizes a combination of energy sources in order to power the vehicle. For example, a battery may be utilized in combination with the traditional combustion engine to provide power to operate the vehicle. Such vehicles are desirable because they take advantage of the benefits of multiple fuel sources in order to enhance performance and range characteristics of the hybrid vehicle relative to a comparable gasoline-powered vehicle.

An example of a hybrid vehicle is a vehicle that utilizes a combination of stored electric energy and an internal combustion engine as power sources to propel the vehicle. An electric vehicle is environmentally advantageous due to its low emissions characteristics and the general availability of electricity as a power source. The battery may be quite large, depending on the energy requirements of the vehicle, and will generate heat that is dissipated using various techniques. Batteries can be quiet emitting low sound. Adjustment between a supplemental energy source, like an engine, can be improved to provide desired vehicle performance characteristics.

SUMMARY

Various embodiments allow an electric or hybrid electric-powered vehicle to provide adjustment between using multiple energy sources and increased performance related to environmental factors, power factors, and longevity factors. In various embodiments, a power and efficiency management system for a vehicle is provided. In various embodiments, various operating modes can be employed by the driver to create a desired look, feel, and sound. In various embodiments, the life of consumable parts such as brake pads can be increased. Various embodiments provide for an improved interaction between the engine and the battery to provide added efficiency and performance.

DETAILED DESCRIPTION

Figure 1:
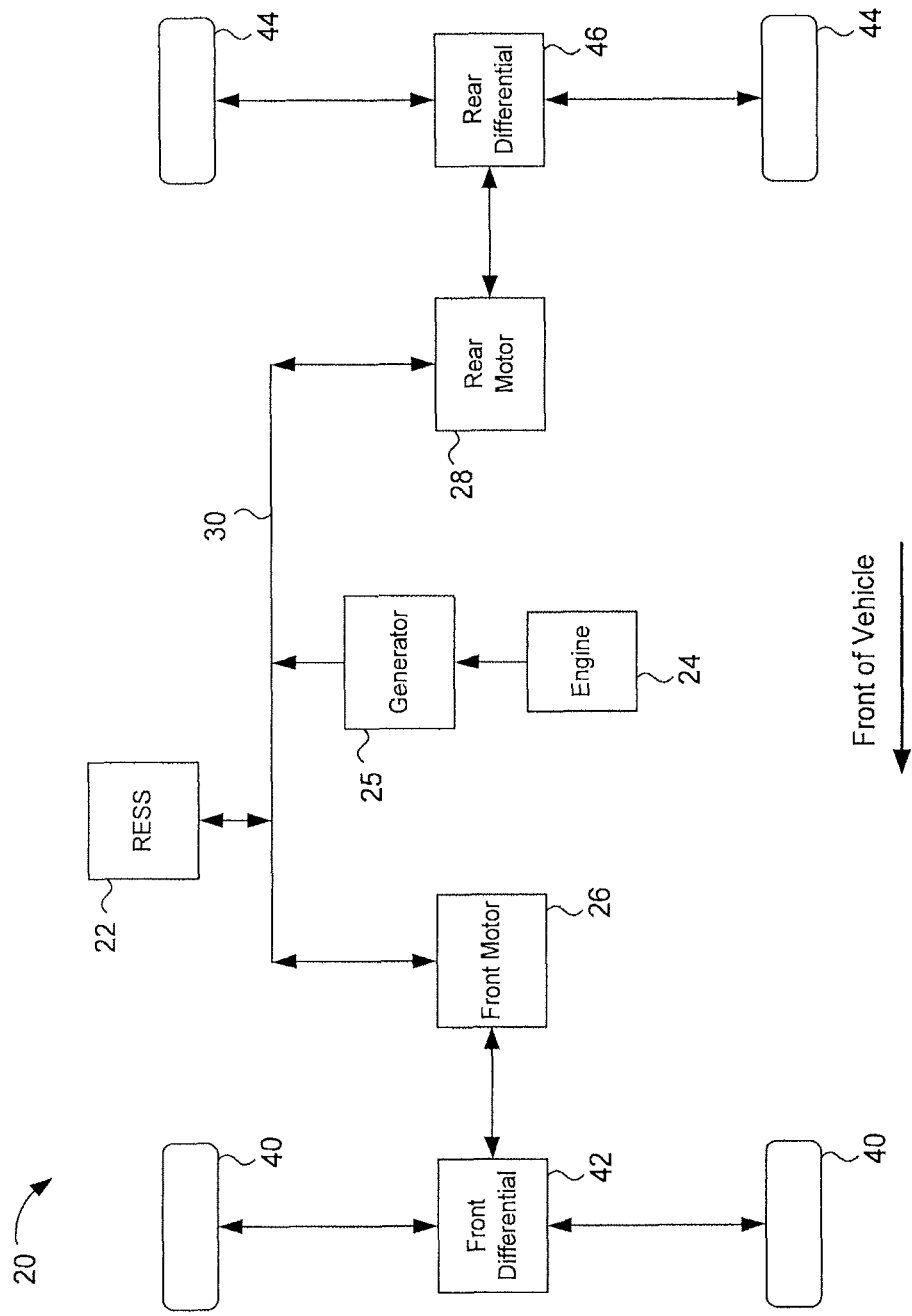
FIG. 1 is a schematic block diagram of a drive system for a vehicle according to an exemplary embodiment of the disclosure.

Referring to FIG. 1, a vehicle, such as a hybrid vehicle 20, includes a rechargeable energy storage system (RESS) 22 coupled with an engine 24. The engine 24 may generally refer to any apparatus operable to augment power or range beyond the RESS 22. For example, the engine 24 can be an internal combustion engine that consumes gasoline. The RESS 22 can be, for example (but not limited to) a high-voltage battery, such as a high-voltage lithium ion battery pack. The engine 24 may drive a generator 25 to provide electrical power to an electrical (e.g., DC) bus 30 to which the RESS 22 may be coupled. Operation of the vehicle 20 can be driven by each power source and/or both. The vehicle 20 can include one or more drive motors, such as a front wheel motor 26 and/or a rear wheel motor 28. The drive motors 26 and 28 can be electrically driven and coupled to the engine 24 and the RESS 22 via the electrical bus 30. In one exemplary embodiment, the motors 26 and 28 may be DC motors.

In other embodiments, the motors 26 and 28 may be AC motors and inverters may be provided between the motors 26 and 28 and a DC bus 30. The motors 26 and 28 engage the front and/or rear drive shafts that turn one or more wheels of the vehicle. In an exemplary embodiment, the front motor 26 may drive the front wheels 40 via a front differential 42 and the rear motor 28 may drive the rear wheels 44 via a rear differential 46.

When the vehicle accelerates or increases energy consumption, speed of the drive motor increases to deliver more power or energy to the wheels. The turning of the motors can be reversed to provide regenerative braking, which provides the impression of downshifting the vehicle. This also generates energy that can be stored in the RESS. Accordingly, in some embodiments, the vehicle can actuate regenerative braking to slow the vehicle rather than causing brake pads to slow the wheels of the vehicle when a brake pedal of the vehicle is depressed. To slow the vehicle beyond the speed caused by the regenerative braking, the brake pads can engage the wheels under predetermined circumstances that are input into a controller of the vehicle. For instance, the brake pads can take over once requested braking surpasses a prefixed set point or threshold.

Various embodiments provide for one or more driver-selectable powertrain operating modes for a vehicle such as a hybrid vehicle. In some embodiments, a first mode or "stealth" mode is a default operating mode for the vehicle. In stealth mode, fuel economy can be favored over performance. To favor fuel economy, the vehicle is powered by the RESS (e.g., high-voltage battery) with little or no supplemental power from the engine. The RESS is used to operate the vehicle until the RESS reaches a first state of charge threshold. The first state of charge threshold may be predetermined and programmed into a controller of the vehicle. The first state of charge threshold may be targeted to maintain battery longevity and performance targets. In stealth mode, the vehicle controller is programmed to prevent engine operation until the RESS reaches its first target state of charge threshold.

Stealth mode allows for quiet vehicle operation for both a driver of the vehicle and to outside observers. Accordingly, this can provide a desired "stealth" look, feel, and sound. The vehicle can emit a particular sound when operating in stealth mode that enhances the "stealth" impression. An external sound system composed of at least a speaker and a sound controller can be included in and/or on the vehicle. The sound controller generates sounds based on vehicle and driver behavior and sends the sounds to the speakers. For example, acceleration can emit a first sound, braking can emit a second sound, and other behaviors like starting and turning off the vehicle can emit additional sounds.

Stealth mode can affect the powertrain thermal strategy. Suitable heating and cooling management of batteries, motors, engines, power electronics, and/or the like can affect vehicle operation performance. For example, lower power limits or higher coolant temperature limits can be specified in stealth mode to reduce fan and pump loads. Accordingly, the thermal system would not have to work as hard if the cooling needs are limited. This decrease in energy consumption may correspond to better fuel economy. In a further example, customer comfort requirements can be relaxed for better fuel economy (e.g., by limiting power allowed for seat heating).

Selection of stealth mode can affect other systems outside of the powertrain system of the vehicle to correlate the driving experience to environmental-friendliness factors. In some embodiments, an acoustic signature of the vehicle can change via active interior and/or exterior sound enhancement. In some embodiments, the vehicle includes a display screen displaying the vehicle along with other features. The features can be customizable. The visual appearance of the vehicle can change on the display screen in stealth mode. Interior and/or exterior lighting can further be changed when operating in stealth mode. Tactile feedback to the driver may change as well.

A second mode or "sport" mode can be a selectable mode that emphasizes performance aspects of the vehicle by allowing for engine operation to aid more than the RESS as compared to stealth mode. The system may include a mechanism to allow the driver to switch between modes. For example, the driver can switch to sport mode and back to stealth via a bidirectional push/pull sport hand paddle 11 on a steering wheel 10 as seen in FIGS. 3, 4, 5, 7, and 10. In the sport mode, the vehicle uses more than one power source to achieve performance targets. The engine may still turn off when the driver does not demand a lot of power, but without significantly sacrificing response time. Sport mode can affect various systems of the vehicle as well, but with the target of creating a performance-oriented driving experience. In the sport and stealth modes, the controller is configured to control the various system components (e.g., the engine, RESS, generator, motor, etc.) to operate as described further below.

The sport mode may be engaged or selected to provide additional power for the vehicle and/or to maintain the RESS at a predetermined second state of charge threshold. The second state of charge threshold may be higher than the first state of charge threshold. The vehicle may be required in an all electric or stealth mode if, for example, the fuel supply for the engine is exhausted or there is a malfunction in the engine. The second state of charge threshold, therefore, may be configured to provide the vehicle with sufficient stored energy such that the vehicle may be operated in an all-electric or stealth mode for a predetermined time period or range (e.g., approximately 26 miles). For example, the second state of charge threshold may correspond to approximately sixty percent of total battery capacity. In another embodiment, the second state of charge threshold may correspond to a fully charged battery or RESS.

If the sport mode is engaged when the state of charge of the RESS is below the second state of charge threshold, the engine may be engaged to drive the generator and provide electrical energy to the DC bus to operate the drive motor(s) and charge the RESS. The sport mode may then operate as a "battery charging" sport mode and at least a portion of this electrical energy may then be utilized to charge the RESS until it reaches the second state of charge threshold. The engine and generator may then be operated to maintain the RESS at the second state of charge threshold and the vehicle is propelled by the drive motor(s) utilizing only electric energy generated by the engine and generator.

If the sport mode is engaged when the state of charge of the RESS is above the second state of charge threshold, the engine may be engaged to drive the generator and provide electrical energy to the DC bus to operate the drive motor(s). The sport mode may then operate as a "battery depleting" sport mode and the RESS may be allowed to discharge until it reaches the second state of charge threshold. The engine and generator may then be operated to maintain the RESS at the second state of charge threshold and the vehicle is propelled by the drive motor(s) utilizing only electric energy generated by the engine and generator.

In another embodiment, the sport mode may be configured to maintain the RESS at the state of charge level of the RESS when the sport mode is engaged, independent of a second state of charge threshold as described above. The state of charge at which the RESS is maintained may be greater than or less than the second state of charge threshold. For example, if the state of charge level is approximately fifty percent of a fully charged RESS, the engine would be controlled to maintain the state of charge level at the fifty percent level. This embodiment may be used to reduce engine run time and emissions by eliminating the battery charging sport mode.

The system may be controlled to operate in a combination of the battery depleting mode and the battery maintaining or sustaining mode. For example, if the RESS state of charge level is greater than the second state of charge threshold the engine will be available to operate, but the RESS will be allowed to discharge down to the second state of charge threshold. If the RESS is at a stage of charge less than the second state of charge threshold when the sport mode is selected, the engine will not operate to charge the RESS. Instead, the engine will operate to maintain or sustain the state of charge at the current level present when the sport mode was selected.

A third mode or "hill" mode can be a selectable mode that improves drivability of the vehicle. Hill mode is a form of electronic downshifting using the RESS and the engine. In some embodiments, in hill mode, a suitable amount of resistance can be provided when driving downhill. This resistance may correlate to speed and can simulate the feel of downshifting in a conventional vehicle. The driver can select the braking or hill mode using a mechanism. For example, the driver can change hill mode via a bidirectional (push/pull) hill paddle 12 on the steering wheel 10 as seen in FIGS. 3, 4, and 6-11.

In various embodiments, hill mode can include a plurality of selectable levels of resistance. For example, three selectable levels of resistance may be provided—H1, H2, and H3. This can be analogous, for example, to three low gears in a transmission. A higher number indicates higher resistance (i.e., higher automatic regenerative braking). Each successive hill paddle 12 pull or push inputs change resistance, for example: OFF→H1→H2→H3→OFF. The driver can also decrement the hill resistance by pushing the hill paddle 12. Any number of modes or engagement/disengagement orders can be employed.

In an example as shown in FIGS. 3-11, the sport paddle 11 and hill paddle 12 are positioned on opposite sides of the steering wheel 10 near typical or comfortable hand positions on the steering wheel 10. In this example, the sport paddle 11 is on a left side and the hill paddle 12 is on the right side. To communicate functionality to the driver, the words "sport" and "hill" can be formed on each of the respective paddles.

In various embodiments, the vehicle enters hill mode automatically by sensing the grade of the road, or vary resistance automatically within a hill mode. For example, a threshold grade can be input into a vehicle controller that is coupled to the transmission. A level sensor or GPS system may send a signal to the controller indicating that the vehicle was driving along a certain grade that reached a preset threshold for driving in hill mode. In some embodiments, the controller may cause the vehicle to switch to hill mode upon receiving the signal. In particular embodiments, the controller may cause the vehicle to switch to a particular hill mode level that corresponds to the detected grade upon receiving the signal.

In various embodiments, hill mode provides relatively consistent resistance regardless of vehicle conditions. Hill mode can generate resistance using several methods, including, but not limited to regenerative braking, using more electricity, engine braking, friction braking, and/or the like.

In some embodiments, regenerative braking may be used to generate resistance. In particular embodiments, the traction motors are engaged as generators to provide energy to the RESS. During downhill or down-grade driving, the engine recharges the RESS.

In some embodiments, resistance may be generated by using more electricity (i.e., more electric energy than normal). The vehicle may do this when the RESS has a full charge. Electrical systems of the vehicle would receive energy either directly from the regenerative braking system or from the RESS. The vehicle could use this energy to cool the battery and motors more aggressively or effectively waste energy by running systems and components inefficiently that would not have operated otherwise. Wasting electrical energy is an alternative to wearing down the brake pads. In some embodiments, electric motors can be used similarly to eddy current brakes by variably short circuiting the electric motor phases through the inverters, thus dissipating energy within the electric motors as heat.

In some embodiments, resistance may be generated by engine braking (e.g., dissipating energy by spinning the engine). If the engine can mechanically drive the wheels, this engine braking is similar to that of a traditional automatic transmission vehicle. If, however, the engine has no mechanical connection to the wheels, as in an example plug-in hybrid vehicle, the vehicle can still dissipate energy by spinning the engine with a generator. The generator would receive energy either directly from the regenerative braking system or from the RESS. The vehicle may do this, for example, when the RESS has a full charge. Engine braking could maintain full hill mode resistance.

In some embodiments, resistance may be generated by friction braking (e.g., engaging brake pads and rotors). The vehicle may do this when the RESS has a full charge and the methods listed above cannot reasonably dissipate enough power or would otherwise be undesired (e.g., to do so would cause severe wear). On a vehicle with regenerative braking, the brake pads get much less use than a conventional vehicle. As such, the use of the brake pads in this scenario would not significantly reduce (if at all) life of the brake pads below that of a conventional vehicle.

Figure 2:
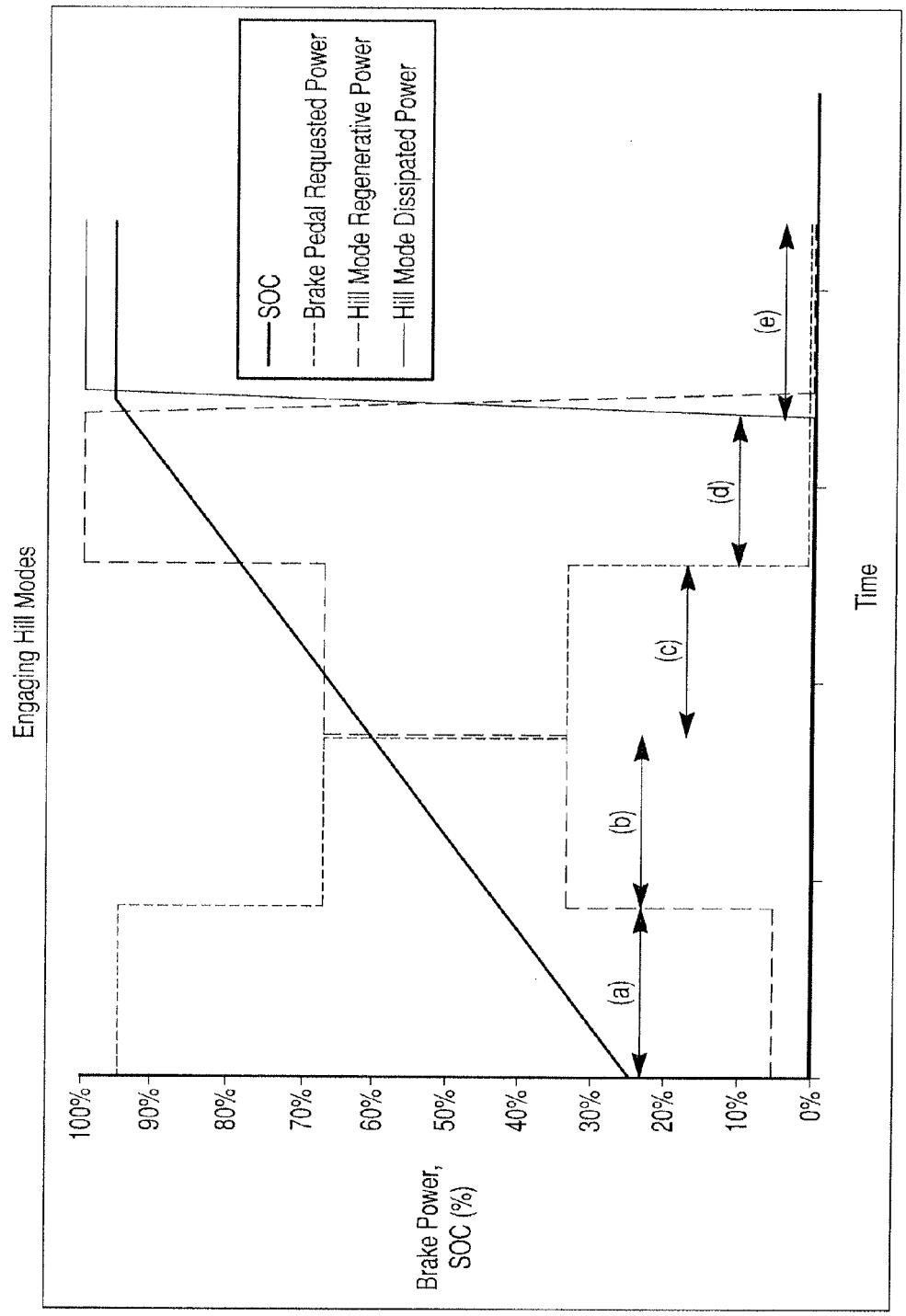
FIG. 2 is a chart representing various modes according to an embodiment of the disclosure.
Figure 3:
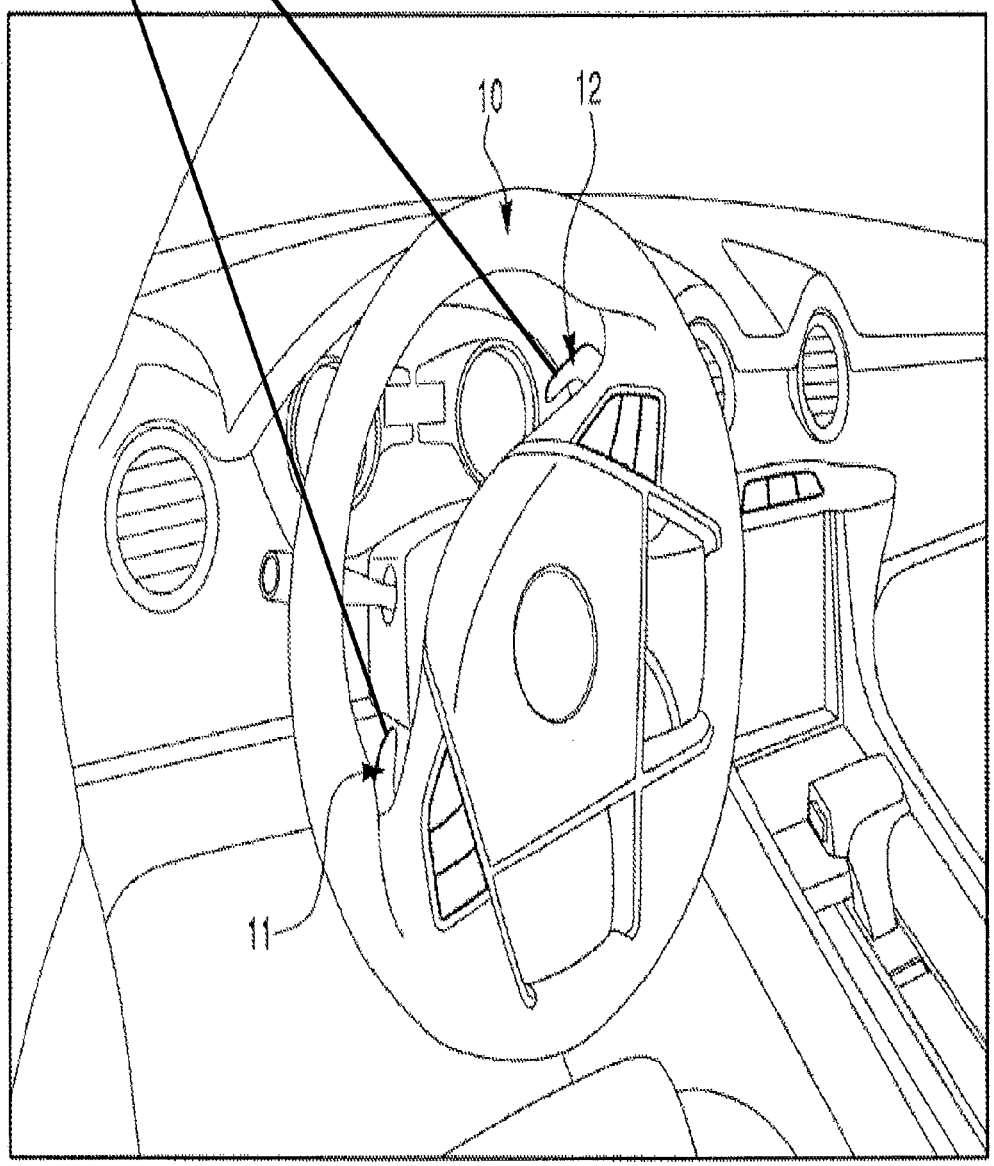
FIG. 3 illustrates a perspective view of an example steering wheel having a pair of hand pedals for adjusting between multiple operational modes according to an embodiment of the disclosure.
Figure 4:
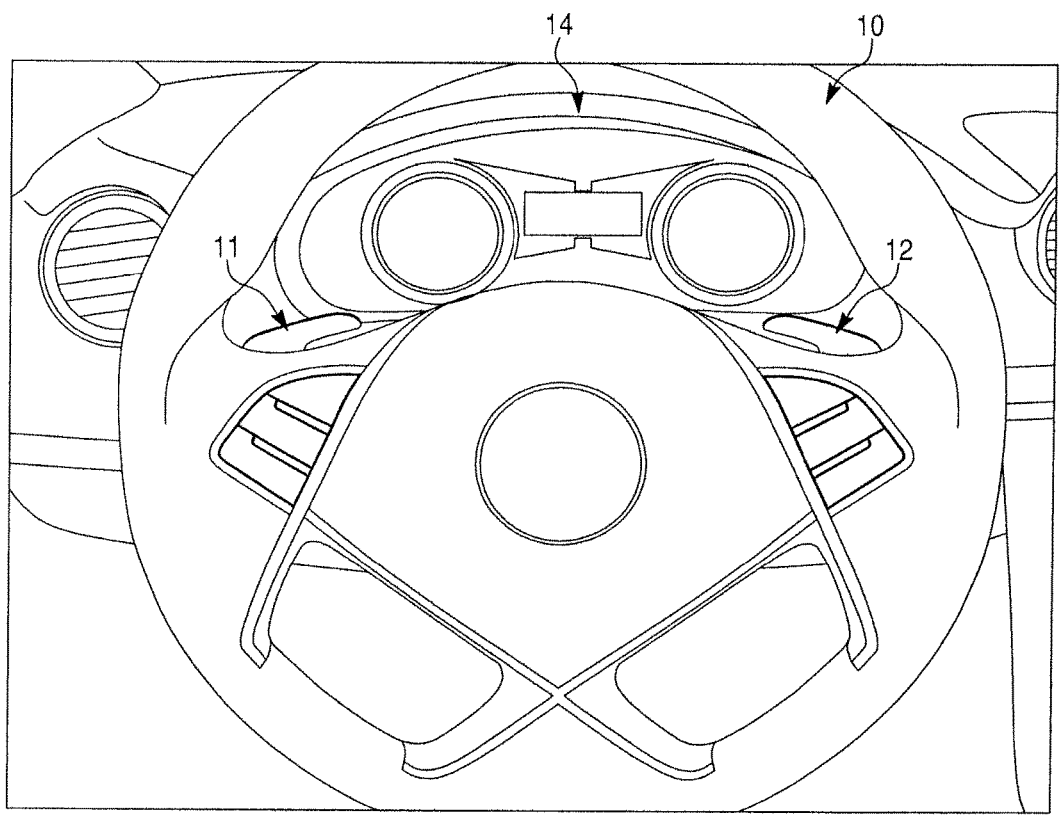
FIG. 4 illustrates a front view of an example steering wheel according to an embodiment of the disclosure.
Figure 5:
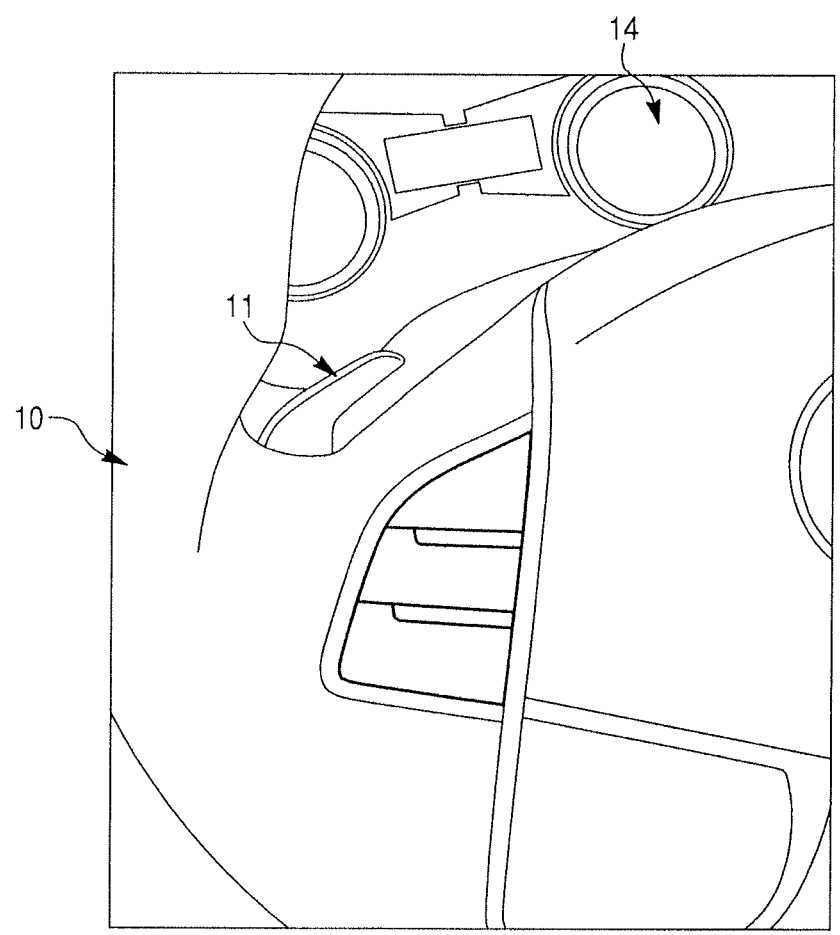
FIG. 5 illustrates a left front view of an example pedal mounted on a steering wheel according to an embodiment of the disclosure.
Figure 6:
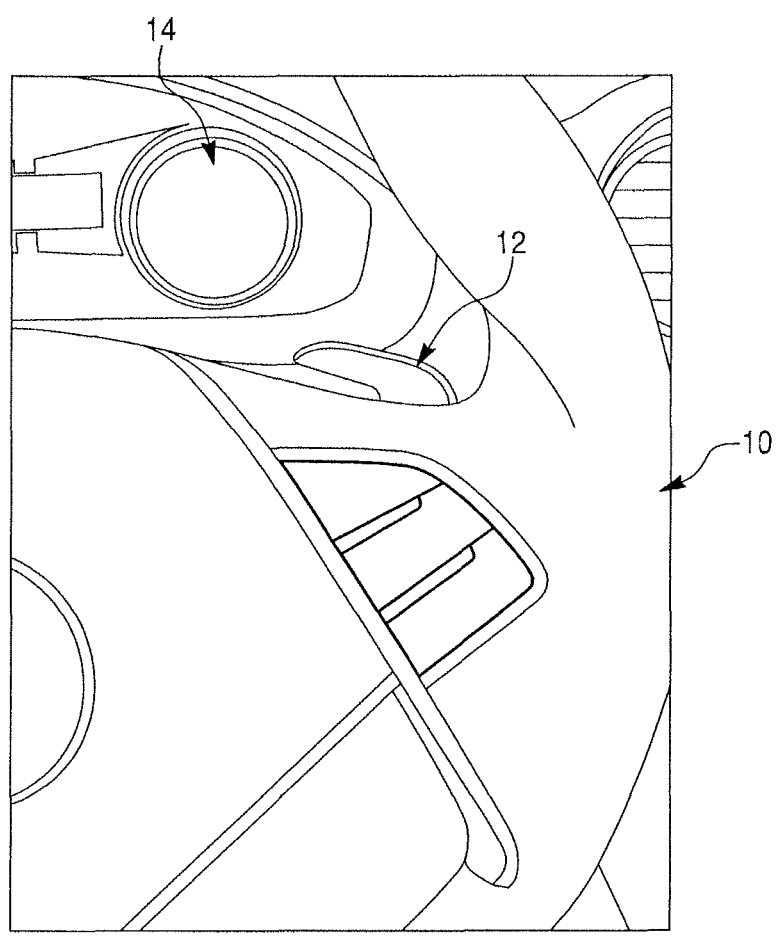
FIG. 6 illustrates a right front view of an example pedal mounted on a steering wheel according to an embodiment of the disclosure.
Figure 7:
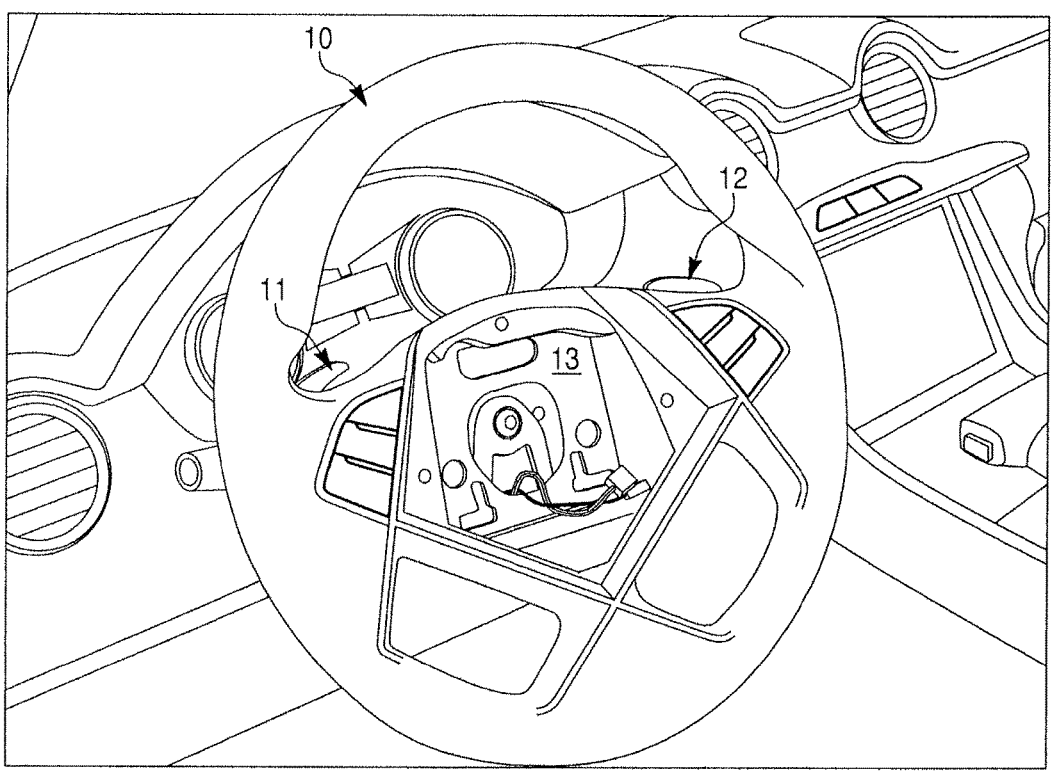
FIG. 7 illustrates an example steering wheel according to an embodiment of the disclosure.
Figure 8:
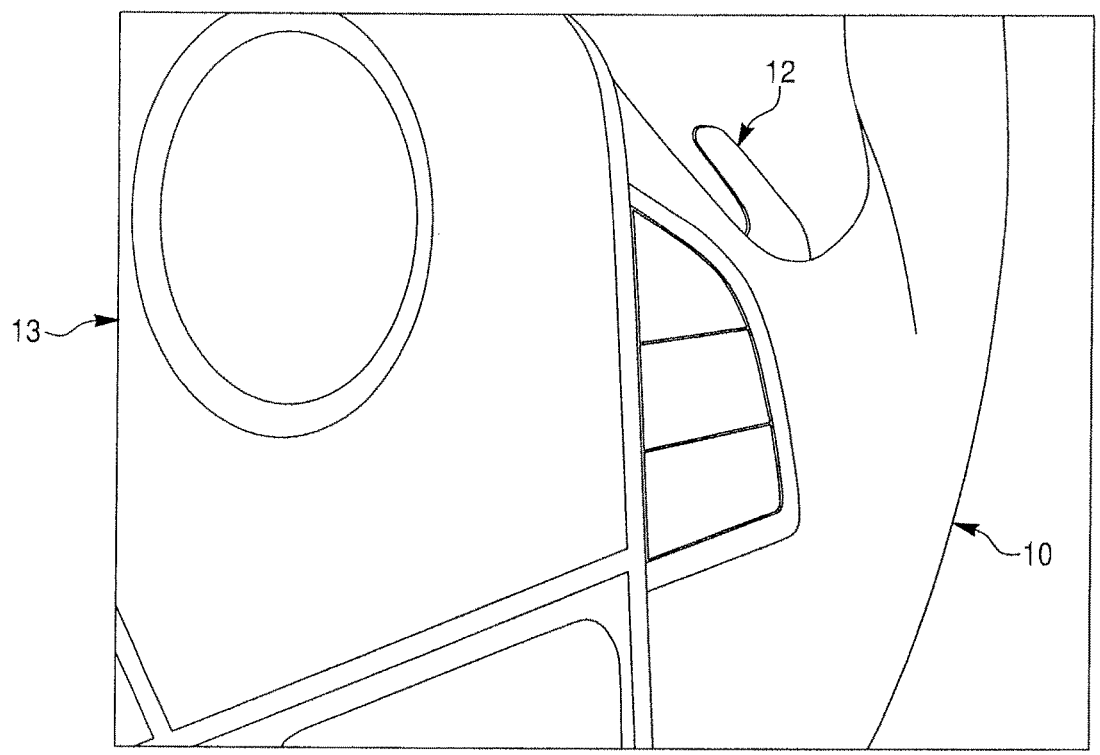
FIG. 8 illustrates an example pedal mounted on a steering wheel according to an embodiment of the disclosure.
Figure 9:
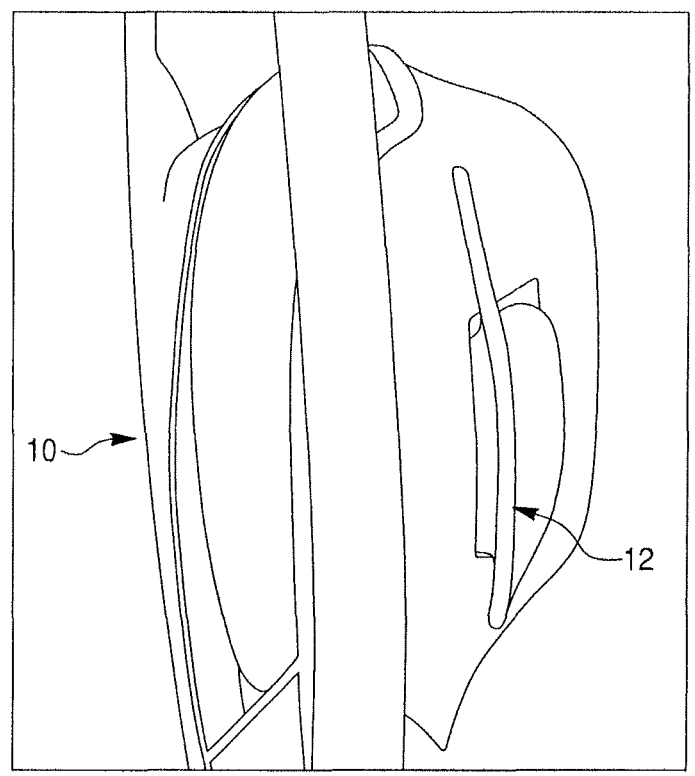
FIG. 9 illustrates a side view of a pedal mounted on a steering wheel according to an embodiment of the disclosure.

FIG. 2 is a chart representing travel down a steep, constant grade at constant speed. It shows RESS state of charge (SOC), manually requested brake power, and brake power automatically engaged by hill mode (regenerative and dissipated). For the time associated with interval (a), hill mode is off (e.g., the vehicle is operating in either sport or stealth mode). The powertrain provides a minimum resistance by default when the brake pedal is not depressed. In this example, the brake pedal requests the remaining majority of braking power to maintain constant speed. The braking in time intervals (a) through (d) is regenerative, whether automatically requested based on operating mode or manually requested by the brake pedal. The regenerative braking causes the RESS to store energy received from the regenerative braking.

During time interval (b), the vehicle is operating in hill mode 1 (H1). In H1, the powertrain provides more resistance (e.g., than either of stealth or sport mode) when no brake pedals are depressed. The majority of the braking power required to maintain constant speed is still requested by the brake pedal. However, the brake pedal is depressed less than in interval (a). FIG. 2 shows automatic brake power requested by H1 at around 30% and brake pedal requested brake power at about 70%.

During time interval (c), the vehicle is operating in hill mode 2 (H2). In H2, the powertrain provides more resistance (e.g., than in H1) when the brake pedal is not depressed. The minority of the braking power required to maintain constant speed is requested by the brake pedal. In this example, automatic hill mode braking power is about 70% and brake pedal-requested power is about 30%.

During time interval (d), the vehicle is operating in hill mode 3 (H3). In H3, the powertrain provides strong resistance when no brake pedals are depressed so that the vehicle is maintained at a constant speed. Manually requested braking is at about 0% while the automatic braking is at about 100%.

During time interval (e), the vehicle is still operating in H3. As the RESS reaches its maximum SOC, the vehicle transitions from storing energy to dissipating energy, for example, using (but not limited to) the methods provided in the disclosure. This allows the driving experience to remain consistent regardless of the RESS SOC.

In various embodiments, stealth mode provides a look, feel, and/or sound associated with advanced technology. This effect, for example, can provide a sense of stealth jets, military technology, spy James-Bond-style technology, and/or the like. In various embodiments, stealth mode also highlights the acoustic signature of the vehicle in electric operation, particularly because the electric powertrain runs quietly.

The term "sport" is commonly used in the automotive industry to associate with acceleration, speed, and handling performance. According to various embodiments, sport mode may be associated with a hybrid vehicle using more than one power source to achieve performance targets.

In various embodiments, hill mode may be used in various circumstances to reduce the need for traditional braking. For example, when the vehicle is in heavy traffic or other related situations, hill mode may be implemented to take advantage of regenerative braking rather than manual braking.

In various embodiments, hill mode allows the vehicle to vary gearing or downhill resistance continuously with controls or a special transmission, e.g. continuously, infinitely, or electronically variable transmission (CVTs, IVTs, & EVTs). In an example, the vehicle has only one gear ratio between the drive motors and the wheels and fully blended regenerative braking.

Figure 10:
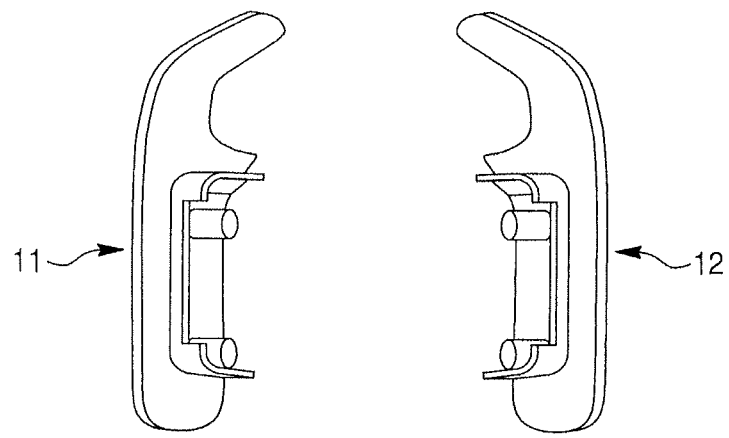
FIG. 10 illustrates a front view of pedals according to an embodiment of the disclosure.
Figure 11:
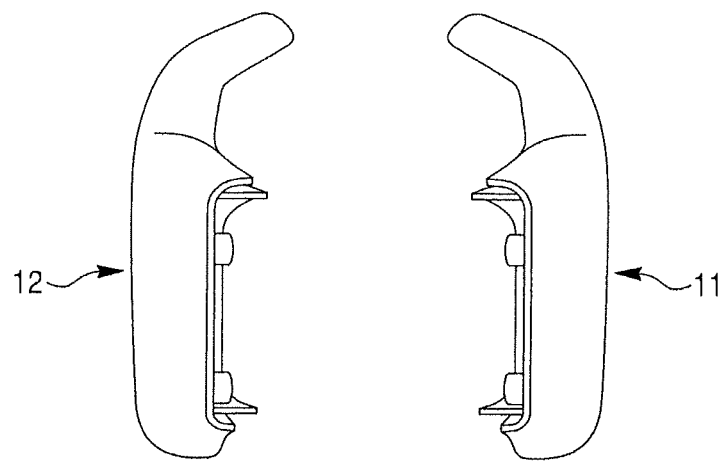
FIG. 11 illustrates a back side rear view of pedals according to an embodiment of the disclosure.

FIGS. 3-11 relate to example steering wheels 10 for an example vehicle associated with the modes described in the disclosure. FIGS. 3-9 show an example steering wheel 10 having a sport hand paddle 11 and a hill hand paddle 12 mounted in opposite positions. A center portion 13 provides an aesthetic cover for various electrical components associated with at least the paddles 11 and 12. The dashboard 14 can include a display for showing various mode operations as well as speed and other associated vehicle conditions. FIGS. 10 and 11 illustrate example hand paddles for sport paddle 11 and hill paddle 12. Each paddle can identify the word "sport" and "hill" respectively for the added convenience of the driver. Although the paddles 11 and 12 are positioned near the circumference of the steering wheel at convenient hand positions for a typical driver, it is understood that the paddles can be disposed at various positions on the wheel or in the vehicle.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for controlling a mode of operation of a driver operated vehicle having a rechargeable energy storage system (RESS), an engine configured to drive an electrical generator, and a drive motor coupled to the RESS and the engine, the drive motor selectively powered by at least one of the RESS and the engine, the system comprising:
   a controller operable to adjust the vehicle to operate in at least two operating modes including a first mode of operation in which the drive motor is powered only by the RESS and a second mode of operation in which the drive motor is powered by electrical power provided by the engine driven generator;
   a switch for the driver to select either the first mode of operation or the second mode of operation;
   a second switch for the driver to select either a first mode of braking operation or a second mode of braking operation;
   wherein when the driver operates the switch to select the first mode of operation the controller is configured to maintain the system in the first mode of operation and ensure that the only power source for the drive motor is the RESS regardless of the power demanded by the driver;
   wherein when the driver operates the switch to select the second mode of operation the controller is configured to operate the engine to generate electric power for the drive motor;
   wherein, when the second mode of operation is selected, the controller is configured to operate the engine as necessary to maintain the RESS at or above a predetermined state of charge;
   wherein, the controller is configured to automatically switch the mode of braking operation when the vehicle detects a grade change in a road through one of a level sensor and a Global Positioning System (GPS).

2. The system of claim 1, wherein the controller is configured to automatically shift the vehicle to the second mode of operation when the RESS reaches a target state of charge threshold.

3. The system of claim 2, wherein the predetermined state of charge is greater than the target state of charge threshold.

4. The system of claim 1, wherein the switch for selecting the mode of operation of the vehicle includes a driver interface that located on the steering wheel;
   and wherein the vehicle includes an external sound system for emitting sounds when the vehicle is in first mode to indicate behaviors including one of acceleration, braking, and starting the vehicle.

5. The system of claim 1, wherein in the first mode of braking operation a first amount of regenerative braking is provided when a brake pedal is not depressed.

6. The system of claim 5, wherein in the second mode of braking operation a second amount of regenerative braking is provided when the brake pedal is not depressed.

7. The system of claim 6, wherein the second amount of regenerative braking is greater than the first amount of regenerative braking.

8. The system of claim 5,
   wherein the second switch includes a driver interface located on the steering wheel.

9. A system for controlling a mode of operation of a driver operated vehicle having a rechargeable energy storage system (RESS); an engine configured to drive an electrical generator, and a drive motor coupled to the RESS and the engine, the drive motor selectively powered by at least one of the RESS and the engine, the system comprising:
   a controller operable to adjust the vehicle to operate in at least two operating modes including a first mode of operation in which the drive motor is powered only by the RESS and a second mode of operation in which the drive motor is powered by electrical power provided by the engine driven generator;
   a switch for the driver to select either the first mode of operation or the second mode of operation;
   a second switch for the driver to select either a first mode of braking operation or a second mode of braking operation;

wherein when the driver operates the switch to select the second mode of operation the controller is configured to operate the engine to generate electric power for the drive motor;

wherein, when the second mode of operation is selected by the driver, the controller is configured to operate the engine as necessary to maintain the RESS at an existing state of charge level present when the second mode of operation is selected by the driver;

wherein, the controller is configured to automatically switch the mode of braking operation when the vehicle detects a grade change in a road through one of a level sensor and a Global Positioning System (GPS).

10. The system of claim 9, wherein when the driver operates the switch to select the first mode of operation the controller is configured to maintain the system in the first mode of operation and ensure that the only power source for the drive motor is the RESS regardless of the power demanded by the driver.

11. The system of claim 9, wherein, when the first mode of operation is selected by the driver, the controller is configured to automatically shift the vehicle to the second mode of operation when the RESS reaches a target state of charge threshold.

12. The system of claim 9, wherein the switch for selecting the mode of operation of the vehicle includes a driver interface is located on the steering wheel;

and wherein the vehicle includes an external sound system for emitting sounds when the vehicle is in first mode to indicate behaviors including one of acceleration, braking, and starting the vehicle.

13. The system of claim 9, wherein in the first mode of braking operation a first amount of regenerative braking is provided when a brake pedal is not depressed.

14. The system of claim 13, wherein in the second mode of braking operation a second amount of regenerative braking is provided when the brake pedal is not depressed.

15. The system of claim 14, wherein the second amount of regenerative braking is greater than the first amount of regenerative braking.

16. The system of claim 13,
wherein the second switch is part of a driver interface located on the steering wheel.

* * * * *